United States Patent [19]
Dalton et al.

[11] Patent Number: 6,067,186
[45] Date of Patent: May 23, 2000

[54] CLASS OF HIGH HYPERPOLARIZABILITY ORGANIC CHROMOPHORES AND PROCESS FOR SYNTHESIZING THE SAME

[75] Inventors: Larry R. Dalton, Bainbridge Island, Wash.; Harold R. Fetterman, Pacific Palisades, Calif.; Fang Wang, Highland Park, N.J.; William Steier, San Marino, Calif.; Aaron W. Harper, Monterey Park, Calif.; Albert S. Ren; Joseph Michael, both of Los Angeles, Calif.

[73] Assignee: Pacific Wave Industries, Inc., Beverly Hills, Calif.

[21] Appl. No.: 09/122,806

[22] Filed: Jul. 27, 1998

[51] Int. Cl.[7] .............................. G02B 1/00; G02B 1/04; G02F 1/035; G02F 1/061
[52] U.S. Cl. ................................ 359/321; 385/2; 385/3; 252/582; 252/583
[58] Field of Search ...................................... 359/321, 245, 359/252, 279; 252/582, 583; 385/2, 3; 428/473.5, 412, 423.1

[56] References Cited

U.S. PATENT DOCUMENTS

| 5,290,630 | 3/1994 | Devonald et al. | 428/333 |
| 5,549,853 | 8/1996 | Beckmann et al. | 252/582 |
| 5,783,306 | 7/1998 | Therien et al. | 428/411.1 |

OTHER PUBLICATIONS

S. Kalluri, "Improved poling and thermal stability of sol–gel nonlinear optical polymers", *Applied Physics Letters*, vol. 65, No. 21, pp. 2651–2653 (1994).

D. X. Zhu, "Noncollinear four–wave mixing in a broad area semiconductor optical amplifier", *Applied Physics Letters*, vol. 70, No. 16, pp. 2082–2084 (1997).

Y. Shi, et al., "Fabrication and Characterization of High–Speed Polyurethane–Disperse Red 19 Integrated Electrooptic Modulators for Analog System Applications", *IEEE Journal of Selected Topics in Quantum Electronics*, vol. 2, No. 2, pp. 289–299 (1996).

S. Kalluri, "Monolithic Integration of Waveguide Polymer Electrooptic Modulators on VLSI Circuitry", *IEEE Photonics Technology Letters*, vol. 8, No. 5, pp. 644–646 (1996).

W. Wang, "40–GHz Polymer Electrooptic Phase Modulators", *IEEE Photonics Techology Letters*, vol. 7, No. 6, pp. 638–640 (1995).

A. Chen, "Optimized Oxygen Plasma Etching of Polyurethane–Based Electro–optic Polymer for Low Loss Optical Waveguide Fabrication", *Journal of Electrochemical Society*, vol. 143, No. 11, pp. 3648–3651 (1996).

L. R. Dalton, et al., "Synthesis and Processing of Improved Organic Second–Order Nonlinear Optical Materials for Applications in Photonics", *Chemistry of Materials*, vol. 7, pp. 1060–1081 (1995).

D. G. Girton, et al., "20 GHz electro–optic polymer Mach–Zehnder modulator", *Applied Physics Letters*, vol. 58, No. 16, pp. 1730–1732 (1991).

D. M. Burland, et al., "Second–Order Nonlinearity in Poled–Polymer Systems", *Chemical Reviews*, vol. 94, pp. 31–75 (1994).

*Primary Examiner*—Margaret Burke
*Attorney, Agent, or Firm*—Henricks, Slavin & Holmes LLP

[57] ABSTRACT

A new class of high hyperpolarizability organic chromophores and a process for synthesizing the same. The chromophores incorporate at least one organic substituent and are formed in consideration of molecular shapes and a spatial anisotropy of intermolecular interactions. The chromophores are processed into hardened material lattices to lock-in poling induced electric-optic activity. Preferred organic substituents are alkyl, aryl, and isophorone groups. A composite including the organic chromophore, in a preferred embodiment, includes a polymer such as a poly (methylmethacrylate), polyimide, polyamic acid, polystyrene, polycarbonate or polyurethane. The optimized chromophores result in hardened electro-optic polymers suitable for electro-optic modulators and other devices such as optical switches. These modulators can be configured to work at high frequencies and in arrays for applications in communications and network connections. In addition, they can be implemented in series and parallel combinations in phased array radar, signal processing and sensor technology applications.

19 Claims, 13 Drawing Sheets

R = -(CH$_2$)$_n$CH$_3$, n = 1-18.
    -(CH$_2$)$_n$Si(CH$_3$)$_3$, n = 1-18.
    -(CH$_2$)$_n$C(CH$_3$)$_3$, n = 1-18.
    -(CH$_2$)$_n$CH$_2$OR", n = 0-18; R" = H, Me, TBDMS, THP, Ac.

R' = -(CH$_2$)$_n$CH$_3$, n = 1-18.
    -(CH$_2$)$_n$Si(CH$_3$)$_3$, n = 1-18.
    -(CH$_2$)$_n$C(CH$_3$)$_3$, n = 1-18.
    -(CH$_2$)$_n$CH$_2$OR", n = 0-18; R" = H, Me, TBDMS, THP, Ac.

- $\mu = 13$ D
- $\beta_0 = 635 \times 10^{-30}$ esu (HRS)
- $\mu\beta_{1.9\mu m} = 17{,}600 \times 10^{-48}$ esu
- $T_d = 312\,°C$ (DSC, 0 °C/min)
  315 °C (TGA, 10 °C/min)
- $\lambda_{max} = 618$ nm in dioxane
  650 nm in $CHCl_3$

FTC

FIG. 6

| Loading Density (wt%) | $r_{33}$ @1.06μm (pm/V) | Refractive Index n |
|---|---|---|
| 9.2 | 41.6 | 1.53 |
| 12.8 | 51.2 | 1.55 |
| 16.6 | 56.8 | 1.57 |
| 20.0 | 55.0 | 1.58 |
| 24.0 | 55.1 | 1.60 |
| 28.0 | 48.6 | 1.61 |
| 32.0 | 45.4 | 1.62 |

CLASS OF HIGH HYPERPOLARIZABILITY ORGANIC CHROMOPHORES AND PROCESS FOR SYNTHESIZING THE SAME

STATEMENT REGARDING FEDERALLY SPONSORED RESEARCH AND DEVELOPMENT

This invention was made with support from the government of the United States of America under Contracts F49620–97-C-0064, F49620–97–1–0307, F49620–97–1–0491, F49620–97-C-0064, F49620–98-C-0059, F49620–98-C-0077, F49620–99–0040 awarded by the United States Air Force. The government of the United States of America h as certain rights in this invention as provided by these contracts.

BACKGROUND OF THE INVENTION

1. Field of the Invention

The present invention relates to a new class of high hyperpolarizability organic chromophores and a process for synthesizing the same and, more particularly, pertains to polymeric electro-optic modulators and switches prepared by incorporating organic π-electron chromophores covalently into electrically-poled polymeric materials.

2. Description of the Related Art

Numerous materials have been proposed for use in electro-optic devices. These include inorganic materials such as lithium niobate, semiconductor materials such as gallium arsenide, organic crystalline materials, organic materials prepared by sequential synthesis methods, and electrically-poled polymer films containing organic chromophores incorporated either physically to form composites or chemically to form homopolymer materials. A general review of nonlinear optical materials and their technological applications is provided in L. Dalton, "Nonlinear Optical aterials", *Kirk-Othmer Encyclopedia of Chemical Technology*, 4th Edition, Volume 17 (John Wiley & Sons, New York, 1995) pp. 288–302; in H. S. Nalwa and S. Miyata, *Nonlinear Optics of Organic Molecules and Polymers*, (CRC Press, Boca Raton, 1997) p. 1–884; in P. N. Prasad and D. J. Williams, *Introduction to Nonlinear Optical Effects in Molecules and Polymers*, (John Wiley & Sons, New York, 1991; and in D. M. Burland, "Second-Order Nonlinearity in Poled Polymer Systems", *Chemical Reviews*, Vol. 94, pages 31–75 (1994)).

Electro-optic materials contain highly polarizable electrons. When an electric field is applied to these materials, the electron polarization changes significantly resulting in an increase in index of refraction of materials and a decrease in the velocity of light passing through the materials. This electric field-dependent material index of refraction can be used to impose electric signals onto optical signals, to switch optical signals in a local area network, or to steer a beam of light. The most commonly used material is currently lithium niobate. This material possesses an electro-optic coefficient on the order of 35 pm/V which results in a typical drive voltage (called $V_\pi$—the voltage required to produce a π phase shift of light) of on the order of 5 volts. Lithium niobate has a high dielectric constant which results in a velocity mismatch of electric and optical waves propagating in the material. This mismatch necessitates a short interaction length (making reduction of drive voltage by increasing device length unfeasible) and limits the bandwidth of the device, for example, a one centimeter electro-optic modulator constructed from lithium niobate typically has a bandwidth of less than 10 Gigahertz. As lithium niobate is a crystalline material, integration with semiconductor electronics and silica fiber optics typically requires sophisticated coupling techniques such as flip-chip bonding and in-diffusion. An electro-optic material that does not suffer from the foregoing limitations would be very desirable.

OBJECTS AND SUMMARY OF THE INVENTION

Thus, it is an object of the present invention to provide an electro-optic material that does not suffer from the limitations of materials such as lithium niobate.

Another object is to provide a new class of high hyperpolarizability organic chromophores and a process for synthesizing the same.

Another object is to provide circuit devices such as an electro-optical modulator employing the new class of high hyperpolarizability organic chromophores.

Putative advantages of organic chromophore-containing polymeric electro-optic materials include a bandwidth significantly in excess of 100 Gigahertz for a one centimeter device and ease of integration with semiconductor electronics (See, L. Dalton et al., "Synthesis and Processing of Improved Organic Second-Order Nonlinear Optical Materials for Applications in Photonics", *Chemistry of Materials*, Vol. 7, No. 6, pages 1060–1081 (1995), incorporated herein by reference). Also, unlike inorganic materials, chromophore-containing polymeric materials afford the opportunity for systematic improvement of material electro-optic activity by design and development of new chromophores and by development of improved processing strategies (See: A. W. Harper et al., "Translating Microscopic Optical Nonlinearity into Macroscopic Optical Nonlinearity: The Role of Chromophore-Chromophore Electrostatic Interactions", *Journal of the Optical Society of America B*, Vol. 15, No. 1, pages 329–337 (1998); L. Dalton et al., "The Role of London Forces in Defining Noncentrosymmetric Order of High Dipole Moment-High Hyperpolarizability Chromophores in Electrically Poled Polymeric Thin Films", *Proceedings of the National Academy of Sciences USA*, Vol. 94, pages 4842–4847 (1997), incorporated herein by reference).

For an organic chromophore to be useful for processing into a hardened polymeric electro-optic material, the chromophore should possess large molecular optical nonlinearity, called hyperpolarizability β, should possess chemical and thermal stability, and should exhibit a small optical absorption coefficient (optical loss) at the intended operating wavelength. Virtually all organic materials, exhibit low dielectric constants and approximately satisfy the condition that $n^2 \approx \epsilon$ where n is the index of refraction and $\epsilon$ is the dielectric constant; thus, all organic electro-optic materials will result in wide bandwidth (greater than 100 Gigahertz devices as far as electro-optic materials are concerned). A commonly employed figure of merit used to compare organic chromophores has been $\mu\beta$ where $\mu$ is the chromophore dipole moment and β is the molecular first hyperpolarizability of the chromophore (See: A. W. Harper et al., "Translating Microscopic Optical Nonlinearity into Macroscopic Optical Nonlinearity: The Role of Chromophore-Chromophore Electrostatic Interactions", *Journal of the Optical Society of America B*, Vol. 15, No. 1, pages 329–337 (1998); L. Dalton et al., "The Role of London Forces in Defining Noncentrosymmetric Order of High Dipole Moment-High Hyperpolarizability Chromophores in Electrically Poled Polymeric Thin Films", *Proceedings of the National Academy of Sciences USA*, Vol.

94, pages 4842–4847 (1997), incorporated herein by reference). Previously, it has been impossible to prepare chromophores with $\mu\beta$ values in excess of $10,000\times10^{-48}$ esu which satisfy the auxiliary requirements of thermal and chemical stability and of low optical loss at telecommunication wavelengths of 1.3 and 1.5 microns. Moreover, chromophores characterized by large $\mu\beta$ values also exhibit large intermolecular electrostatic interactions leading to intermolecular aggregation and associated light scattering leading to unacceptably high values of optical loss at operating wavelengths (See: A. W. Harper et al., "Translating Microscopic Optical Nonlinearity into Macroscopic Optical Nonlinearity: The Role of Chromophore-Chromophore Electrostatic Interactions", *Journal of the Optical Society of America B*, Vol. 15, No. 1, pages 329–337 (1998); L. Dalton et al., "The Role of London Forces in Defining Noncentrosymmetric Order of High Dipole Moment-High Hyperpolarizability Chromophores in Electrically Poled Polymeric Thin Films", *Proceedings of the National Academy of Sciences USA*, Vol. 94, pages 4842–4847 (1997), incorporated herein by reference).

Once a chromophore of appropriate optical nonlinearity ($\mu\beta$), optical absorption, and stability (both chemical and thermal) has been identified, the material must be processed into a hardened polymeric materials containing acentrically-aligned chromophores. The hardened material, in turn, is translated by reactive ion etching or photolithography, for example, into buried channel waveguide structures which can be integrated with appropriate drive electronics and silica fiber transmission lines (See, L. Dalton et al., "Synthesis and Processing of Improved Organic Second-Order Nonlinear Optical Materials for Applications in Photonics", *Chemistry of Materials*, Vol. 7, No. 6, pages 1060–1081 (1995), incorporated herein by reference).

To withstand processing conditions (the deposition of metal electrodes) and operational conditions (operation optical power levels at 1.3 and 1.5 microns), chromophore-containing polymer materials must be hardened subsequent to electric field poling to withstand temperatures of 90° C. or greater. Chromophores must be modified with reactive functionalities (e.g., hydroxyl groups) which permit processing into hardened polymer matrices (See, L. Dalton et al., "Synthesis and Processing of Improved Organic Second-Order Nonlinear Optical Materials for Applications in Photonics", *Chemistry of Materials*, Vol. 7, No. 6, pages 1060–1081 (1995), incorporated herein by reference). When thermosetting (addition or condensation) chemical reactions are employed to lock-in electric field poling-induced acentric order, a stepped poling protocol where temperature and electric field strength is increased in successive steps is frequently required to optimize material electro-optic activity (See, S.Kalluri et al., "Improved Poling and Thermal Stability of Sol-Gel Nonlinear Optical Polymers," *Applied Physics Letters*, Vol. 65, pages 2651–2653 (1994), incorporated herein by reference).

By optimizing the conditions of reactive ion etching, low loss optical waveguides can be fabricated in polymeric waveguides containing acentrically order organic chromophores (See: W. H. Steier et al., "Applications of Electro-Optic Polymers in Photonics," Materials Research Society Symposium Proceedings, Vol. 413, *Electrical, Optical and Magnetic Properties of Organic Solid State Materials* (Materials Research Society, Pittsburgh, 1996) pages 147–58; A. Chen et al., "Optimized Oxygen Plasma Etching of Polyurethane Based Electrooptic Polymers for Low Loss Waveguide Fabrication," *Journal of the Electrochemical Society*, Vol. 143, pages 3648–3651 (1996), incorporated herein by reference). A variety of other techniques can also be employed to fabricate buried channel active electro-optic waveguides including laser ablation, multi-color photolithography, and spatially selective poling (See, L. Dalton et al., "Synthesis and Processing of Improved Organic Second-Order Nonlinear Optical Materials for Applications in Photonics", *Chemistry of Materials*, Vol. 7, No. 6, pages 1060–1081 (1995), incorporated herein by reference).

The integration of polymeric waveguide electro-optic modulators with semiconductor very large scale integration (VLSI) circuitry demonstrates the putative advantage of polymeric electro-optic materials for integration with semiconductor electronics (See: S. Kalluri et al., "Integration of Polymer Electrooptic Devices on Non-Planar Silicon Integrated Circuits," *Proceedings of the SPIE*, Vol. 2527, pages 375–383 (1995); S. Kalluri et al., "Monolithic Integration of Waveguide Polymer Electrooptic Modulators on VLSI Circuitry," *IEEE Photonics Technology Letters*, Vol. 8, pages 644–646 (1996), incorporated herein by reference).

Low loss coupling schemes for coupling polymeric modulator waveguides to silica fiber transmission lines can also be employed (See, A. Chen et al., "Integrated Polymer Waveguide Mode Size Transformer with a Vertical Taper for Improved Fiber Coupling," Optoelectronic Interconnects and Packaging IV, eds., R. P. Chen and P. S. Gulfoyle, *Proceedings of the SPIE*, Vol. 3005, pages 65–76 (1997), incorporated herein by reference).

The putative large operational bandwidth of polymeric modulators has been demonstrated in a series of experiments establishing ever increasing bandwidth records and leading to the current record of 113 Gigahertz (See: D. G. Girton et al., "20 GHz Electro-Optic Polymer Mach-Zehnder Modulator", *Applied Physics Letters*, Vol. 58, pages 1730–1732 (1991); W. Wang et al., "40-GHz Polymer Electrooptic Phase Modulators", *IEEE Photonics Technology Letters*, Vol. 7, pages 638–640 (1995); D. Chen et al., "High-Bandwidth Polymer Modulators," *Proceedings of the SPIE*, Vol. 3007, pages 314–317 (1997); D. Chen et al., "Demonstration of 110 GHz Electro-Optic Polymer Modulators," *Applied Physics Letters*, Vol. 70, pages 2082–2084 (1997), incorporated herein by reference).

The present invention provides a new level of performance of polymeric electro-optic modulators surpassing lithium niobate and semiconductor material modulators in terms of electro-optic coefficient as well as material defined bandwidth performance. The material class that represents the materials basis of this disclosure is characterized not only by exceptional optical nonlinearity ($\mu\beta$ values in excess of $15,000\times10^{-48}$ esu) but also by exceptional (particularly for a high $\mu\beta$ chromophore) thermal and chemical stability and by low absorption loss at 1.3 and 1.5 micron wavelengths (communication band wavelengths).

These materials are readily fabricated into electro-optic modulator devices using protocols previously developed for other chromophores. The materials are fully amenable to all processing steps necessary for the fabrication of devices. The materials exhibit improved photochemical stability compared to commonly used Disperse Red chromophore-containing materials (See, Y. Shi et al., "Fabrication and Characterization of High-Speed Polyurethane-Disperse Red 19 Integrated Electro-Optic Modulators for Analog System Applications," *IEEE Journal of Selected Topics in Quantum Electronics*, Vol. 2, pages 289–299 (1996), incorporated herein by reference).

According to the present invention, these materials can be employed not only in conventional electro-optic modulator devices configurations but also in devices employing a constant bias field which permits the full potential of the materials to be demonstrated. Examined as composites in poly(methylmacrylate), PMMA, chromophores of the class which are designated FTC exhibit electro-optic coefficients greater than 50 pm/V at 1.064 microns. In hardened poly (urethane), PU, materials electro-optic coefficients greater than 40 pm/V are observed at 1.064 microns. Slightly smaller electro-optic coefficients are observed at 1.3 microns consistent with theoretical expectations. An optical loss on the order of 0.75 dB/cm is observed for the FTC-PMMA materials while optical loss in the range 1–2 dB/cm is observed for hardened FTC-PU materials; the precise value of optical loss depends upon processing protocols employed.

The present invention embodies a new theory of intermolecular interactions which has been developed and employed to optimize the design of second order nonlinear optical chromophores. Explicitly, the detailed shape of molecules and the full spatial anisotropy of intermolecular interactions is taken into account to calculate the predicted variation of macroscopic materials electro-optic coefficients versus chromophore number density in the host polymer matrix. A quantitative prediction of the maximum electro-optic coefficients can be obtained for a given chromophore π-electron structure and molecular shape. Chromophores have been systematically modified with alkyl, aryl, and isophorone substituents to systematically improve macroscopic electro-optic coefficients and to minimize optical loss from aggregation.

The new class of organic chromophores exhibiting exceptional molecular optical nonlinearity, thermal stability, and low optical absorption at telecommunication wavelengths are processed into hardened electro-optic polymers which lead to improved electro-optic device performance. In particular, bandwidths of greater than 100 Gigahertz, drive voltages of less than 5 volts, and optical loss of less than 1.5 dB/cm are achieved in the worst case performance. The method of the present invention achieves hardened material lattices to lock-in poling induced electro-optic activity. Another new device configuration for electro-optic modulators employs a constant dc electric bias, which permits the full potential of new electro-optic materials to be realized.

An organic chromophore, in accordance with a specific illustrative embodiment of the present invention, is a chromophore processed into a hardened material lattice suitable for a wave guide structure, with the chromophore incorporating at least one organic substituent and being formed in consideration of molecular shapes and a spatial anisotropy of intermolecular interactions.

In a further aspect of the present invention, the at least one organic substituent comprises alkyl, aryl, and isophorone groups.

In an alternative further aspect of the present invention, the chromophore is acentrically-aligned.

In another aspect of the present invention, a composite including the organic chromophore further includes a polymer material such as a poly(methylmacrylate), polyimide, polyamic acid, polystyrene, polycarbonate or polyurethane.

In another aspect of the present invention, a modulator device includes single elements or arrays of phase and amplitude optical modulators formed from high hyperpolarizability organic chromophores, the modulators operating at frequencies from DC to at least 120 GHz.

In another aspect of the present invention, a modulator device includes a combination of phase and amplitude modulators formed from high hyperpolarizability organic chromophores, the modulators being configured to perform signal processing such as microwave phase shifting for radars, high-speed optical A/D conversion and high-speed optical switches.

In another aspect of the present invention, a process for synthesizing an organic chromophore includes the step of forming an organic chromophore within a hardened polymer lattice by incorporating hydroxyl substituents adapted to cause a thermosetting reaction to establish an electric field poling-induced acentric order.

In another aspect of the present invention, a process for synthesizing an organic chromophore includes the step of forming an organic chromophore with two photon crosslinking reaction chemistry to establish an electric field poling-induced acentric order.

In another aspect of the present invention, a process for synthesizing an organic chromophore includes the step of forming an organic chromophore within a host polymer matrix in consideration of a detailed shape of molecules and a full spatial anisotropy of intermolecular interactions to provide a predicted variation of macroscopic materials electro-optic coefficients versus chromophore number density in said host polymer matrix. The modulator can be fabricated by spinning the organic chromophore and host polymer on any substrate. In applications requiring a conformal, or thin, device, the substrate can be a flexible substrate such as Mylar®.

BRIEF DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIG. 6 provides a tabulation of measured electro-optic coefficient versus chromophore loading (chromophore number density). Also, given is the index of refraction versus chromophore loading which establishes that a solid solution is maintained over the concentration range studied.

DETAILED DESCRIPTION OF THE PREFERRED EMBODIMENTS

Figure 1:
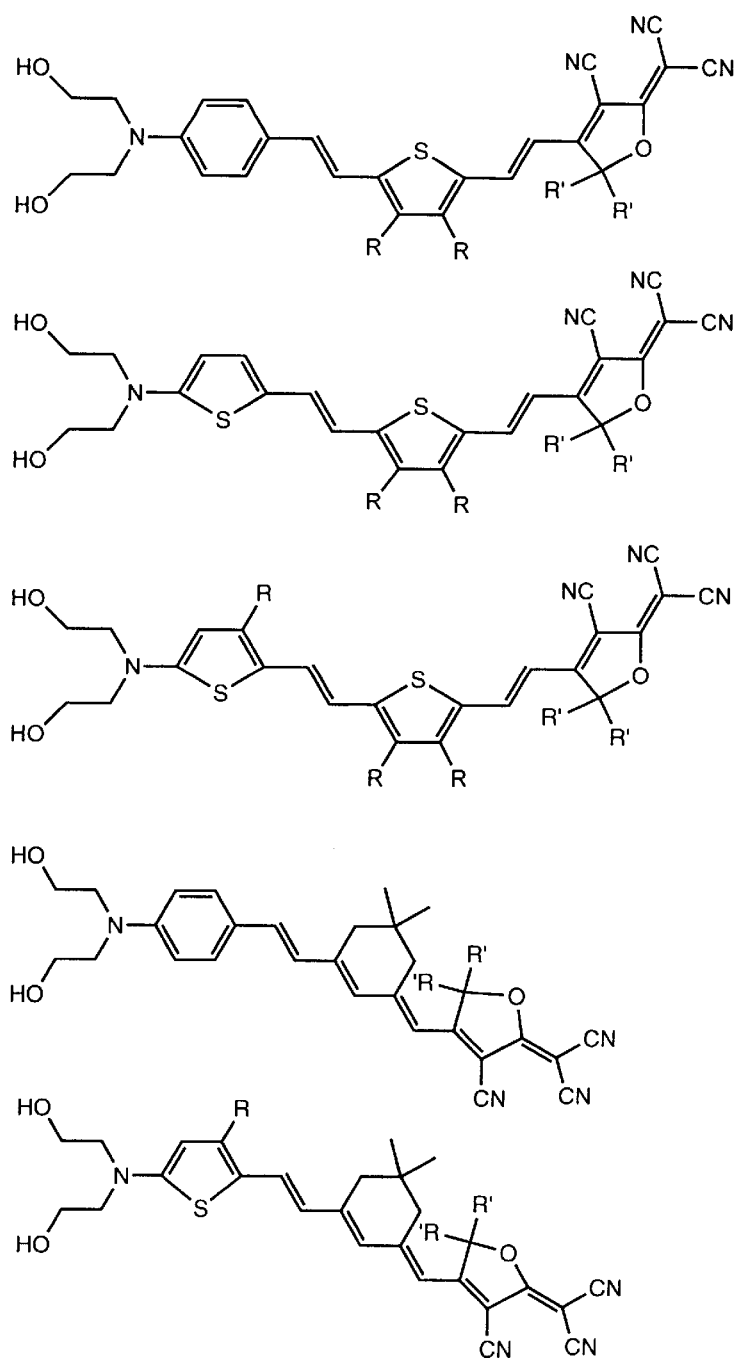
FIG. 1 shows the FTC chromophore class structures according to an exemplary preferred embodiment of the present invention. The R and R' groups have been systematically modified according to the process of the present invention to achieve optimum electric field poling efficiency and thus maximum electro-optic coefficients.
Figure 2:
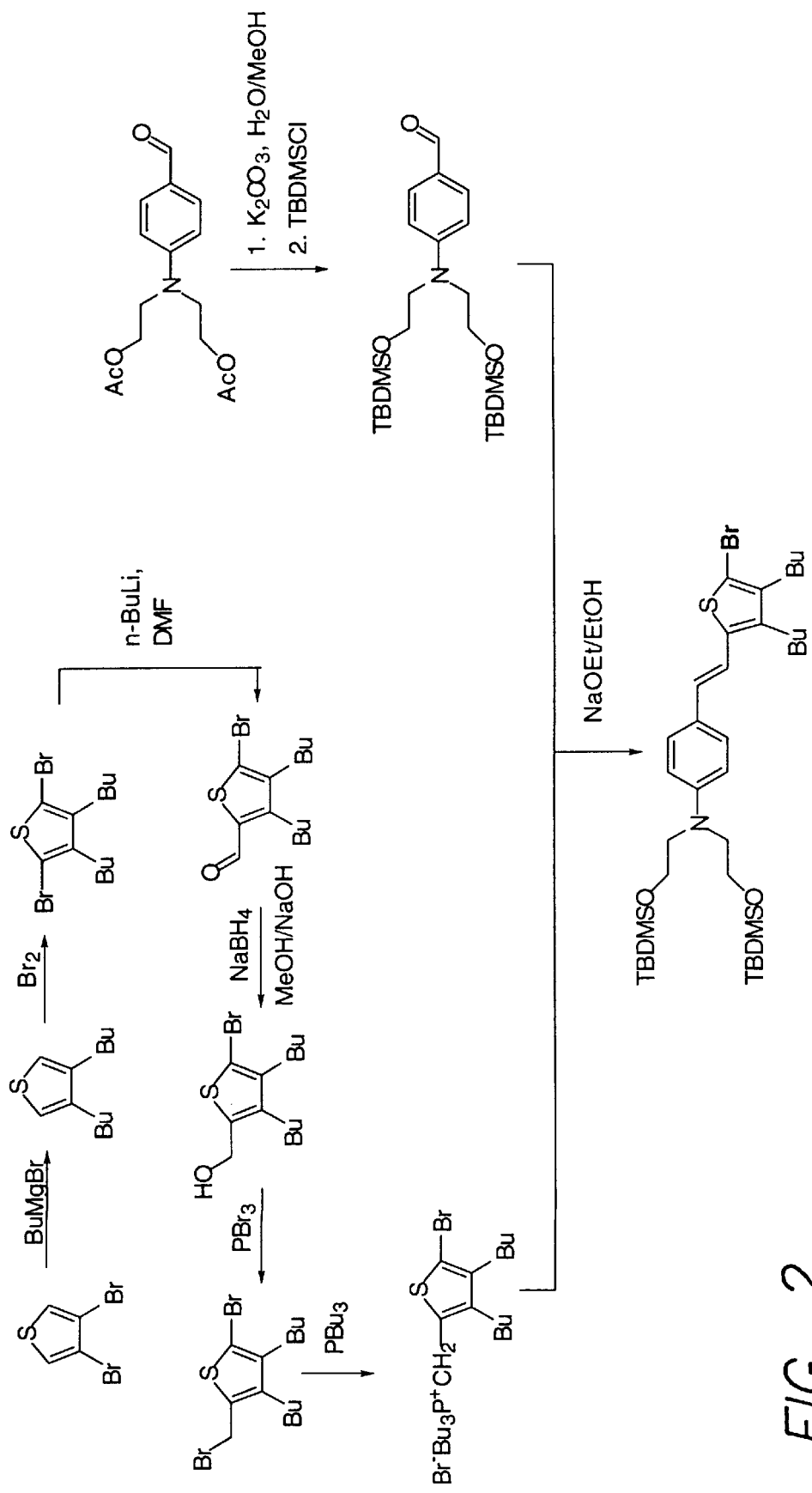
FIGS. 2 and 3 show the synthesis of a representative FTC chromophore.
Figure 3:
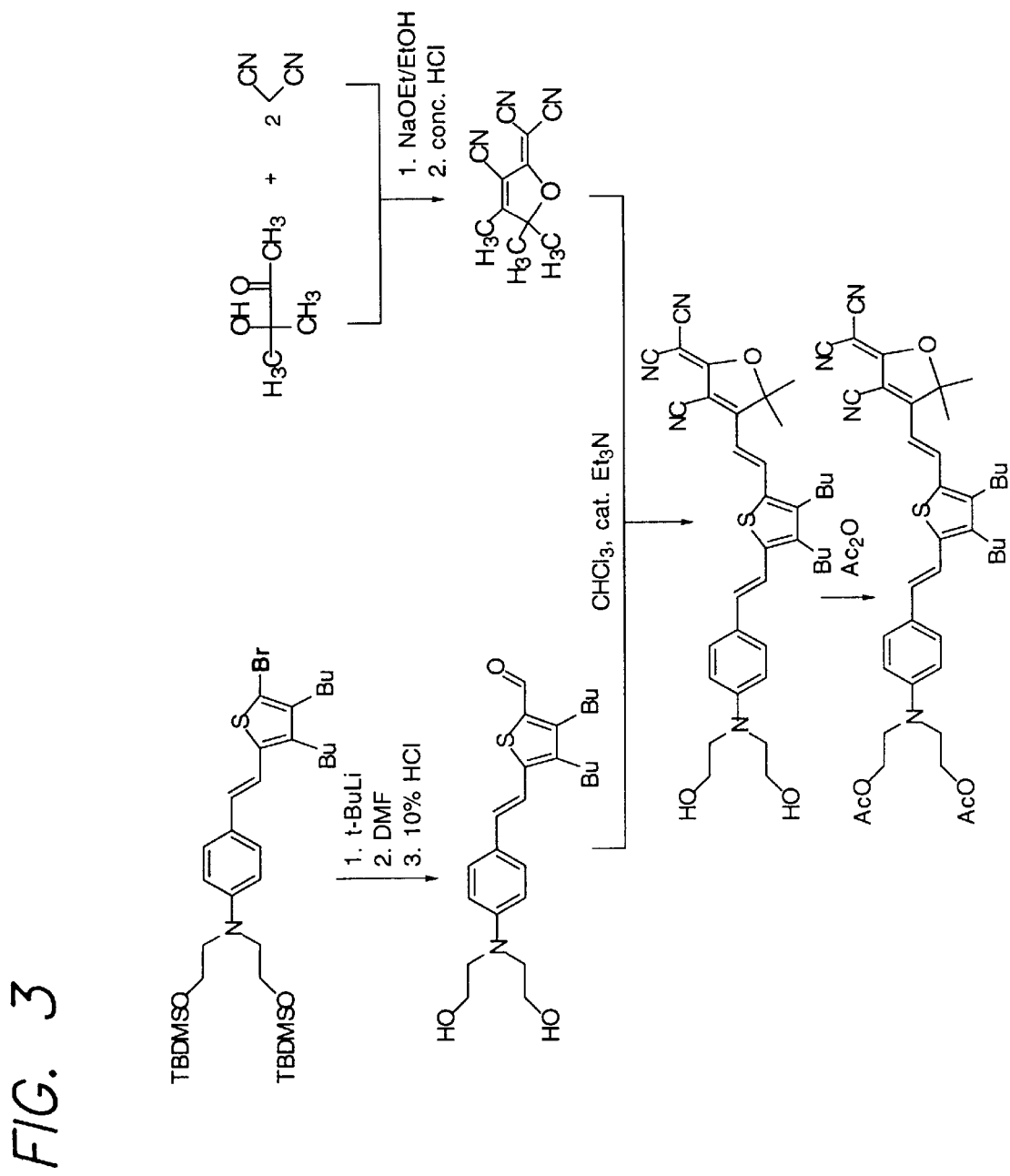

A new class of nonlinear optical chromophores shown in FIG. 1 have been synthesized (see FIGS. 2 and 3 for the general synthesis scheme). The detailed synthesis is described as follows:

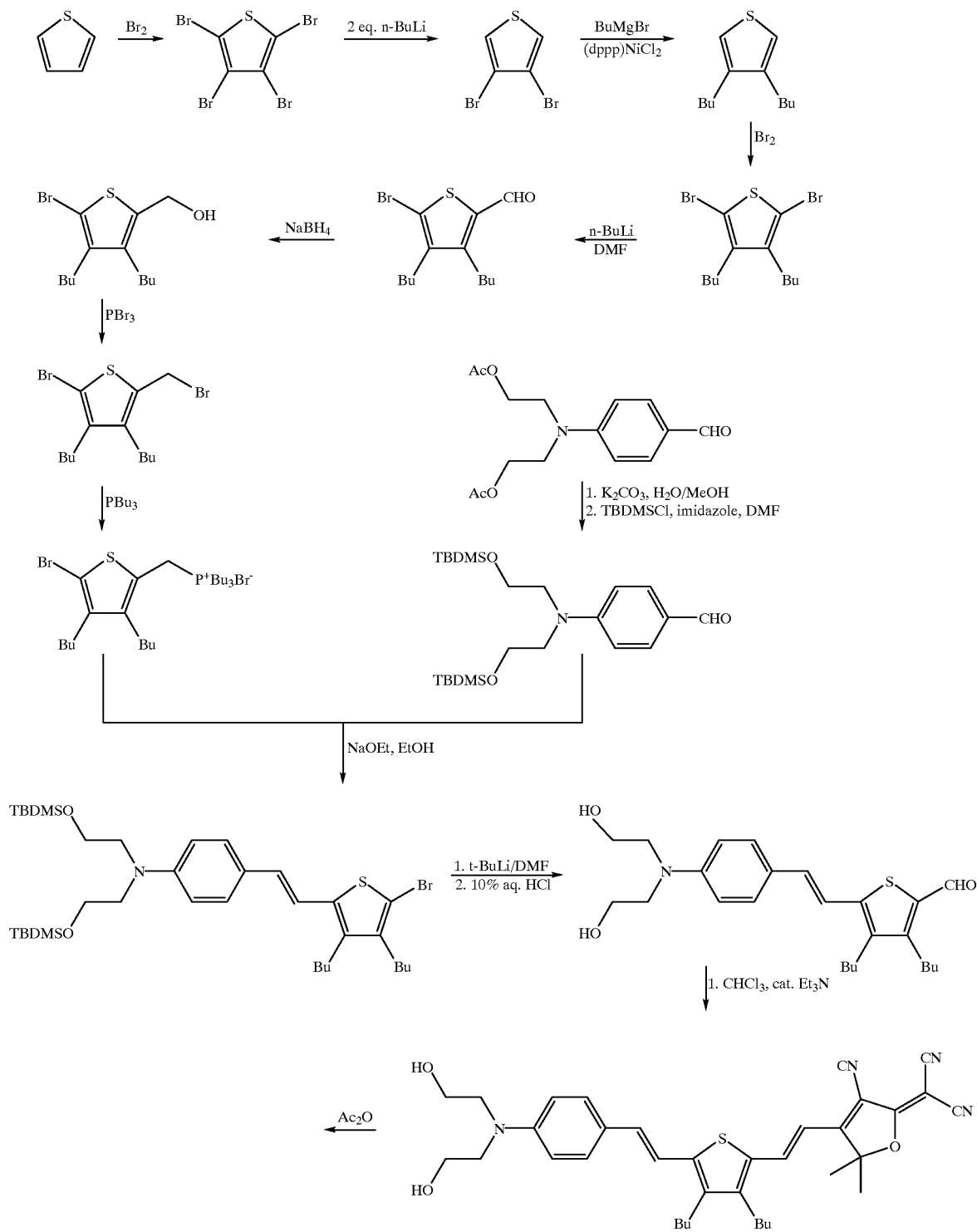

-continued

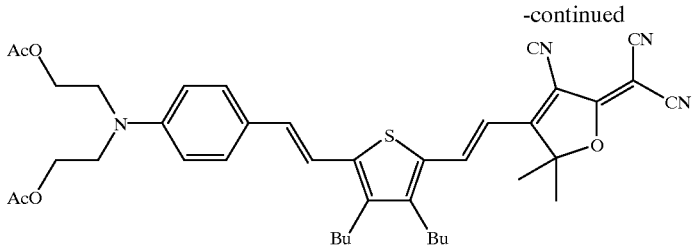

Synthesis of 2-Dicyanomethylen-3-cyano-4,5,5-trimethyl-2,5-dihydrofuran

In a 1 L round-bottomed flask, a solution of sodium ethoxide was prepared by adding 2.3 g (0.1 mole) sodium to 200 ml ethanol. To this solution 10.4gram (0.1 mole) of 3-methyl-3-hydroxy-2-butanone and 13.2 grams (0.2 mole) of malononitrile were added. The resulting mixture was stirred for 20 h at room temperature. After concentration in vacuo, the residue was acidified with conc. HCl to adjust the pH to 4–5. The crude precipitate was filtered and recrystallized from ethanol to give 7.2 g pure furan derivatives 1 as pale or light yellow needles (36w). Melting point: 198° C. $^1$H NMR (Bruker 250, ppm, in chloroform): 2.37 (s, 3H), 1.64 (s, 2H). $^{13}$C NMR (Bruker 250, ppm, in chloroform): 185.0, 177.3, 112.2, 111.5, 110.0, 103.6, 101.3, 23.5, 14.2.

Synthesis of the FTC Chromophore (4)

The synthesis of the donor-bridge aldehyde for chromophore FTC (4) followed the procedures established by the inventors of the present invention (See, F. Wang, Design, Synthesis, and Characterization of Novel Organic Chromophores and Polymers for Electro-Optic Modulation, Ph.D. Thesis, University of Southern California, Los Angeles, 1998, incorporated herein by reference). $^1$H NMR of intermediates and the detailed procedure for the intermediates is described as follows:

3,4-Dibromothiophene: $^1$H NMR (Bruker 250, CDCl$_3$) 7.28 s (2H).

3,4-Dibutylthiophene: $^1$H NMR (Bruker 250, CDCl$_3$) 6.8 9 (s, 2H) 2.51 (t, 4H), 1.61 (m, 4H), 1.39 (m, 4H), 0.952 (t, 6H).

2,5-Dibromo-3,4-dibutylthiophene: $^1$H NMR (Bruker 250, CDCl$_3$) 2.52 (t, 4H), 1.43 (m, 8H), 0.952 (t, 6H).

2-Bromo-3,4-dibutyl-thiophene-5-carbaldehyde: $^1$H NMR (Bruker 250, CDCl$_3$) 9.89 (s, 1H), 2.86 (t, 4H), 2.51 (m, 4H), 1.43 (M, 4H), 0.952 (t, 6H).

2-Bromo-3,4-dibutyl-5-hydroxymethyl-thiophene: $^1$H NMR (Bruker 250, CDCl$_3$) 4.68 (s, 2H), 2.51 (m, 4H), 1.69 (s, 1H), 1.42 (m, 8H), 0.952 (t, 6H).

2-Bromo-3,4-dibutyl-5-thienylmethyltributylphosphonium bromide: $^1$H NMR (Bruker 250, CDCl$_3$) 4.28 (d, 2H), 2.69 (m, 2H), 2.55 (m, 8H), 1.49 (m, 14H), 1.31 (m, 6H), 0.986 (t, 9H), 0.883 (t, 6H).

4-[N,N-di(2-acetoxyethyl)amino]-benzaldehyde: $^1$H NMR (Bruker 250, ppm, in CDCl$_3$) 9.71 (s, 1H), 7.70 (d, 2H), 6.78 (d, 2H), 4.24 (t, 4H), 3.68 (4H), 2.00 (s, 6H).

4-{N,N-di-[2-(1,1,2,2,-tetramethyl-1-silapropoxy)ethyl] aminobenzaldehy-de: $^1$H NMR (Bruker 250, ppm, in CDCl$_3$) 9.70 (s, 1H), 7.68 (d, 2H), 6.73 (d, 2H), 3.78 (t, 4H), 3.60 (4H), 0.88 (s, 18H), 0.03 (s,12H).

2-{trans-4-[N,N-di[2-(1,1,2,2,-tetramethyl-1-silapropoxy) ethyl]amino-phenylene}-3,4-dibutyl-5-bromo-thiophene (6): 37.25 grams of 4-di(2-(1,1,2,2,-tetramethyl-1-silapropoxy)ethyl)-aminobenzaldehyde (85.1 mmol) and 250 ml (0.2837 M) of 2-bromo-3,4-dibutyl-5-thienylmethyltributylphosphonium bromide (70.9 mmol) were mixed in 200 mL ethanol. The mixture was heated to 80° C. 106 mL (1M, 1.5 eq.) sodium ethoxide in ethanol was added drop-wise, at 80° C. The reaction mixture was kept refluxing for 48 hours, before it was poured into 600 ml water. The crude product was extracted from aqueous phase with ether (2× 200 mL) and dried over MgSO$_4$. After concentration via rotavap, the crude product was eluted down from a column with 5% ethyl acetate and hexane mixture as eluent to yield 30 grams of thick yellow oil (59.7%). $^1$H NMR (Bruker 250, ppm, in CDCl$_3$): 7.29 (d, J$_{H-H}$=8.5, 2H), 6.93 (d, J$_{H-H}$=15.6, 1H), 6.66 (d, J$_{H-H}$=9.2, 2H), 3.75 (t, J$_{H-H}$=6.8, 4H), 3.52 (t, J$_{H-H}$=6.3, 4H), 0.88 (s, 18H), 0.03 (s, 12H).

Synthesis of 2-[trans-(4-N,N-di(2-hydroxyethyl)-amino)-phenylene-(3,4-dibutyl-thien-5]-al (3): 26 grams (36.7 mmol) of compound 6 was dissolved in 200 ml tetrahydrofuran and cooled down to −78° C., using acetone/dry-ice bath. 56 mL (1.5 M, 84.3 mmol) of t-butyllithium in hexane was added drop-wise at −78° C. Dark blue color was observed at the end of the addition. The reaction mixture was warmed up to −30° C. slowly and 20 mL of dimethylformamide was added. After stirring for half hour at room temperature, 150 mL 10% HCl solution was added to the reaction mixture. The mixture was stirred at room temperature for 4 hours. The organic solvent was evaporated and the residue was diluted with 150 mL water and extracted with hexane (2×150 mL). The aqueous was adjusted to pH=8–9. The crude aldehyde was extracted out with ether. Column chromatography afforded 12.3 grams of dark red solid (78%). $^1$H NMR (Bruker 250, ppm, in DMSO-d$_6$): 9.93 (s, 1H), 7.45 (d, J$_{H-H}$=9.0, 2H), 7.13 (d, J$_{H-H}$=16.0, 1H), 7.02 (d, J$_{H-H}$=16.2, 1H), 6.69 (d, J$_{H-H}$=8.8, 2H), 4.77 (t, J$_{H-H}$=5.3, 2H),), 3.52 (3, J$_{H-H}$=5.5, 4H), 3.45 (t, J$_{H-H}$=5.0, 4H), 2.86 (t, J$_{H-H}$=6.8, 2H), 2.66 (t, J$_{H-H}$=6.2, 2H), 1.39 (m, 8H), 0.91 (m, 6H). $^{13}$C NMR (Bruker 250, ppm, in DMSO-d$_6$): 182.3, 153.1, 147.5, 140.1, 133.3, 132.7, 128.6, 122.6, 114.2, 111.4, 58.1, 53.1, 34.0, 32.9, 22.1, 22.0, 13.7.

2-dicyanomethylen-3-cyano-4-{2-[trans-(4-N,N-di(2-hydroxyethyl)amino)-phenylene-(3,4-dibutyl)thien-5]-E-vinyl}-5,5-dimethyl-2,5dihydrofuran (monomer 7): 1 g (2.33 mmol) of aldehyde 3 and 0.62 grams (3.11 mmol) of acceptor 1 were mixed in 3 mL tetrahydrofuran and 3 mL CHCl$_3$ with one drop of triethylamine as catalyst. The mixture was kept at reflux for overnight. Reaction progress was checked with TLC until almost all the starting material was consumed. The solvent was removed via rotary evaporation. Column chromatography with 40% acetone in methylene chloride as eluent afforded 1.17 grams of pure product as dark purple solid (77.5%). $^1$H NMR (Bruker 250, ppm, in DMSO-d$_6$): 8.15 (d, J$_{H-H}$=15.3, 1H), 7.49 (d, J$_{H-H}$=9.0, 2H), 7.21 (d, J$_{H-H}$=15.8, 1H), 7.10 (d, J$_{H-H}$=15.5, 1H), 6.72 (d, J$_{H-H}$=9.0, 2H), 6.58 (d, J$_{H-H}$=15.0, 1H), 4.78 (t, J$_{H-H}$=5.0, 2H), 3.54 (t, J$_{H-H}$=5.3, 4H), 3.49 (m,4H), 2.71 (m, 4H), 1.71 (s, 6H), 1.41 (m, 8H), 0.91 (m, 6H). $^{13}$C NMR (Bruker 360, ppm, in DMSO-d$_6$): 177.3, 174.3, 153.9, 149.0, 148.8, 141.5, 137.6, 134.5, 131.8, 129.1, 123.1, 114.2, 113.3, 112.5, 112.4, 111.6, 110.6, 98.4, 93.1, 58.2, 53.2, 51.9, 33.6, 32.8, 26.7, 25.7, 25.3, 22.3, 22.0, 13.8, 13.7. Melting Point (DSC, 10°/min.): 183° C. $T_d$(DSC, 10°/min): 258° C. $\lambda_{max}$: 657 nm (in CHCl$_3$). Elemental analysis: Found, C 70.54; H 6.83; N 9.00. Theoretical, C$_{70.79}$; H 6.93; N 9.17.

2-dicyanomethylen-3-cyano-4-{2-[E-(4-N,N-di(2-acetoxyethyl)-amino)-phenylene-(3,4-dibutyl)thien-5]-E-vinyl}-5,5-dimethyl-2,5dihydrofuran (4): 0.26 grams (0.425 mmol) of Chromophore 9 was dissolved in 3 mL of acetic anhydride and heated for 3 hours at 60° C. Acetic anhydride was removed under vacuum. Column chromatography with 20% hexane in ethyl acetate afford 0.29 grams of analytical pure product (97w). $^1$H NMR (Bruker 250, ppm, in CDCl$_3$): 8.14 (d, $J_{H-H}$=15.5, 1H), 7.39 (d, $J_{H-H}$=8.5, 2H), 7.03 (s, 2H, strong second order effect), 6.76 (d, $J_{H-H}$=8.8 2H), 6.38 (d, $J_{H-H}$=15.5, 1H), 4.24 (t, $J_{H-H}$=6.3, 4H), 3.66 (t, $J_{H-H}$=5.8, 4H), 2.64 (m, 4H), 2.04 (s, 6H), 1.69 (s, 6H), 1.45 (m, 8H), 0.95 (m, 6H). C NMR (Bruker 250, ppm, in CDCl$_3$): 173.0, 170.9, 154.0, 148.8, 148.0, 142.0, 138.0, 134.0, 132.5.8, 128.9, 125.1, 115.3, 112.6, 112.2, 111.9, 111.7, 110.2, 96.7, 93.7, 61.2, 60.4, 49.7, 34.0, 33.1, 27.6, 26.6, 26.4, 22.9, 22.7, 20.9, 13.9. Melting point (DSC, 10°/min.): 130.3° C. $T_d$ (DSC, 10°/min): 310.6° C. $\lambda_{max}$: 653 nm (in CHCl$_3$).). Elemental analysis: Found, C 69.35; H 6.69; N 7.92. Theoretical, C 69.14; H 6.67; N 8.06.

Diethyl 2-thiophenemethylphosphonate: $^1$H NMR (Bruker 250, ppm, in CDCl$_3$) 7.10 (m, 1H), 6.91 (m, 2H), 4.00 (m, 4H), 3.30 (d, 2H), 1.21 (t, 6H).

4-[N,N-di(2-acetoxyethyl)amino]phenylene-2-thiophene (8): The key intermediate 8 was synthesized as the following: 8.5 g (71.6 mmol) sodium t-butoxide in 25 ml THF was added drop-wise to a mixture of 17.5g (59.7 mmol) 4-[N,N-di(2-acetoxyethyl)amino]-benzaldehyde and 15.4 g (65.7 mmol) diethyl 2-thiophene-methylphosphonate in 30 mL THF at 0° C. The reaction mixture was stirred overnight in an unattended ice-bath, then was poured into 800 ml cold water. The aqueous mixture was extracted with methylene chloride and dried over MgSO$_4$. Evaporation of the solvent after filtration gave the desired donor-bridge. The acetyl groups were hydrolyzed by the conditions of the Horner-Emmons reaction. Reprotection was carried out in acetic anhydride at 45° C. for three hours. Column chromatography over silica gel, eluting with 30% ethyl acetate in hexanes afforded 14.5 g pure product. $^1$H NMR (Bruker 250, ppm, in CDCl$_3$): 7.34 (d, 2H), 7.12 (dd, 1H), 7.04 (d, 1H), 6.98 (d, 1H), 6.95 (d, 1H), 6.83 (d, 1H), 6.73 (d, 2H), 4.24 (t, 4H), 3.63 (t, 4H), 2.04 (s, 6H). $^{13}$C. NMR (Bruker 250, ppm, in CDCl$_3$): 170.9, 146.7, 143.6, 128.2, 127.7, 127.5, 126.1, 124.8, 123.2, 118.2, 112.2, 61.3, 49.7, 20.9.

Synthesis of trans -[(N, N-di(2-acetoxyethyl)amino)phenylene-2-thien-5-al (9): In a 200 mL 3-necked round-bottomed flask equipped with a stirring bar, addition funnel and argon inlet, 16.04 g (0.217 mole; 99%) of DMF was cooled in an ice-bath. 12.4g (0.08 mole, 99%) of POCl$_3$ was added drop-wise through the addition funnel. The mixture was stirred at ice-bath temperature for 1 hour, then at room temperature for another hour. 27.6 g (0.0724 mole, 98%) of compound 7 in 30 mL 1,2-dichloroethane was added drop-wise. The funnel was replaced with a condenser after the addition. The reaction mixture was heated at 90° C. for three hours and then cooled slightly before it was poured into 600 mL ice-water. The aqueous layer was extracted with methylene chloride. The organic portion was washed with saturated NaHCO$_3$ solution and dried over MgSO$_4$. Immediate column chromatography afforded 12.5g (43%) product as orange-red waxy solid. $^1$H NMR (Bruker 250, ppm, in CDCl$_3$): 9.77 (s, 1H), 7.58 (d, 1H), 7.34 (d, 2H), 7.04 (d, 1H), 7.01 (d, 1H), 6.94 (d, 1H), 6.66 (d, 2H), 4.20 (t, 4H), 3.55 (t, 4H), 2.02 (s, 6H). $^{13}$C NMR (Bruker 250, ppm, in CDCl$_3$): 182.2, 170.8, 154.0, 148.0, 140.0, 137.6, 133.3, 128.5, 125.0, 123.7, 116.0, 111.7, 61.4, 48.5, 45.2, 32.1, 20.8, 12.1.

Synthesis of 2-dicyanomethylen-3-cyano-4-{2-[E-(4-N,N-di(2-acetoxyethyl)amino)phenylene-2-thien-5]-E-vinyl}-5,5-dimethyl-2,5-dihydrofuran (5): The condensation reaction between the donor-bridge aldehyde (9) and the acceptor (1) can be carried out in both ethanol (with piperidine as catalyst) and chloroform (with triethylamine as catalyst). Thus, 0.6 g (1.5 mmol) of aldehyde 9 and 0.36 g (1.8 mmol) of acceptor 1 and one drop of triethylamine was mixed in 5 ml chloroform. The reaction mixture was refluxed under argon for approximately ten hours. The mixture was loaded to a column and eluted with 50% ethyl acetate in hexane. 0.33g (38%) of dark blue solid was yielded. $^1$H NMR (Bruker 360, ppm, in DMSO-d$_6$): 8.09 (d, $J_{H-H}$=16.2, 1H), 7.74 (d, $J_{H-H}$=3.6, 1H) 7.48 (d, $J_{H-H}$=8.6, 2H), 7.29 (d, $J_{H-H}$=16.2, 1H), 7.26 (d, $J_{H-H}$=5.0, 1H), 7.19 (d, $J_{H-H}$=15.8, 2H), 6.81 (d, $J_{H-H}$=9.0, 2H), 6.65 (d, $J_{H-H}$=15.5, 2H), 4.16 (t, $J_{H-H}$=6.1, 4H), 3.65 (t, $J_{H-H}$=5.8, 4H), 1.98 (s, 6H), 1.78 (s, 6H),. $^{13}$C NMR (Bruker 250, ppm, in DMSO-d$_6$): 178.4, 176.9, 176.8, 174.5, 170.4, 153.1, 148.2, 140.4, 138.8, 137.7, 133.9, 128.9, 127.8, 124.0, 116.6, 113.0, 112.3, 111.9, 111.2, 98.6, 96.6, 61.0, 59.7, 52.8, 48.8, 25.5, 20.7. Melting point (DSC): 174° C. Td (DSC): 290° C. $\lambda_{max}$: 629 nm (in CHCl$_3$). Elemental analysis: Found, C 64.34; H 5.35; N 8.93. Theoretical, C 65.96; H 5.19; N 9.62.

Compound 10. $^1$H NMR (Bruker 360, ppm, in CDCl$_3$): 7.57 (d, J=15.8, 1H), 7.51 (d, J=9.36, 2H), 6.70 (d, J=15.1, 1H), 6.67 (d, J=8.64, 2H), 4.24 (t, $J_{H-H}$=6.3, 4H), 3.66 (t, $J_{H-H}$=5.8, 4H) 2.04 (s, 6H), 1.72 (s, 6H).

Figure 8:
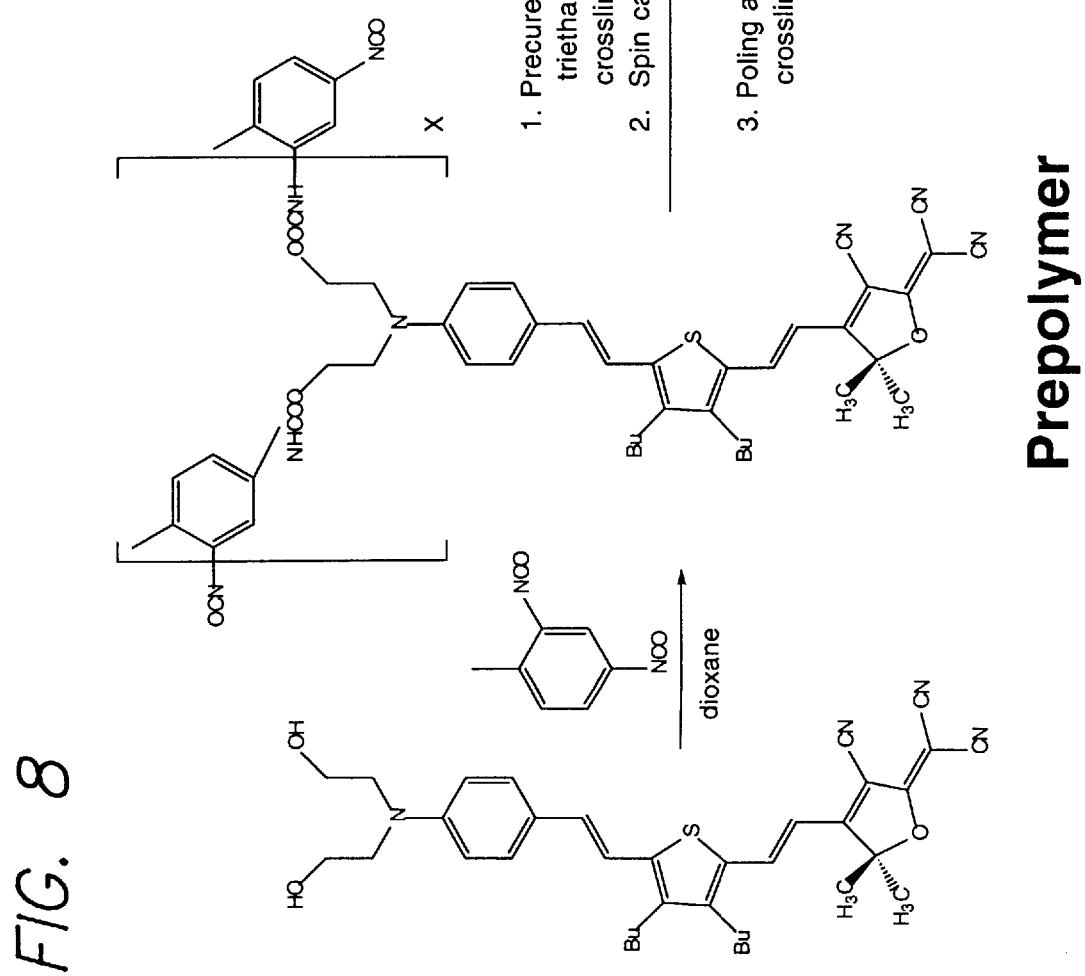
FIG. 8 shows the synthesis of a hardened PU-FTC material.

The hydroxyl terminated versions of the FTC chromophore (either di- or tri-functionalized chromophores) are processed into hardened polymer lattices with acentrically ordered chromophores illustrated in FIG. 8.

Figure 4:
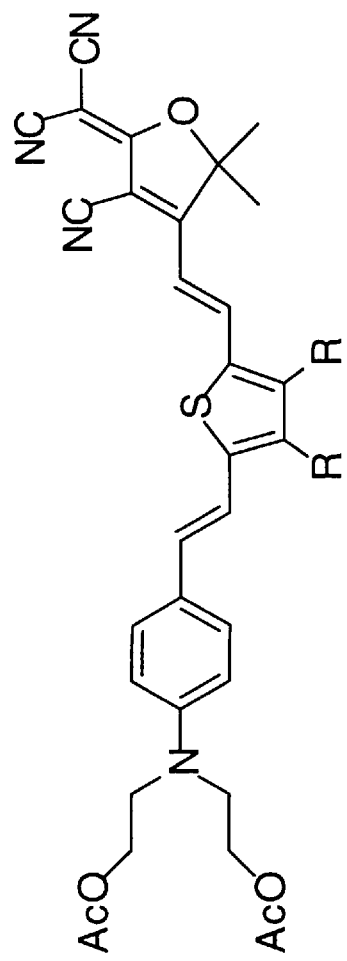
FIG. 4 shows typical optical, nonlinear optical, and thermal data obtained for a representative FTC chromophore.

FIG. 4 shows typical optical, nonlinear optical, and thermal data obtained for a representative FTC chromophore. Hyperpolarizability, β, was determined by hyper-Rayleigh scattering while the product of dipole moment and hyperpolarizability, μβ, was determined by electric field induced second harmonic generation. Thermal stability was determined by thermal gravimetric analysis and differential scanning calorimetry.

Figure 5:
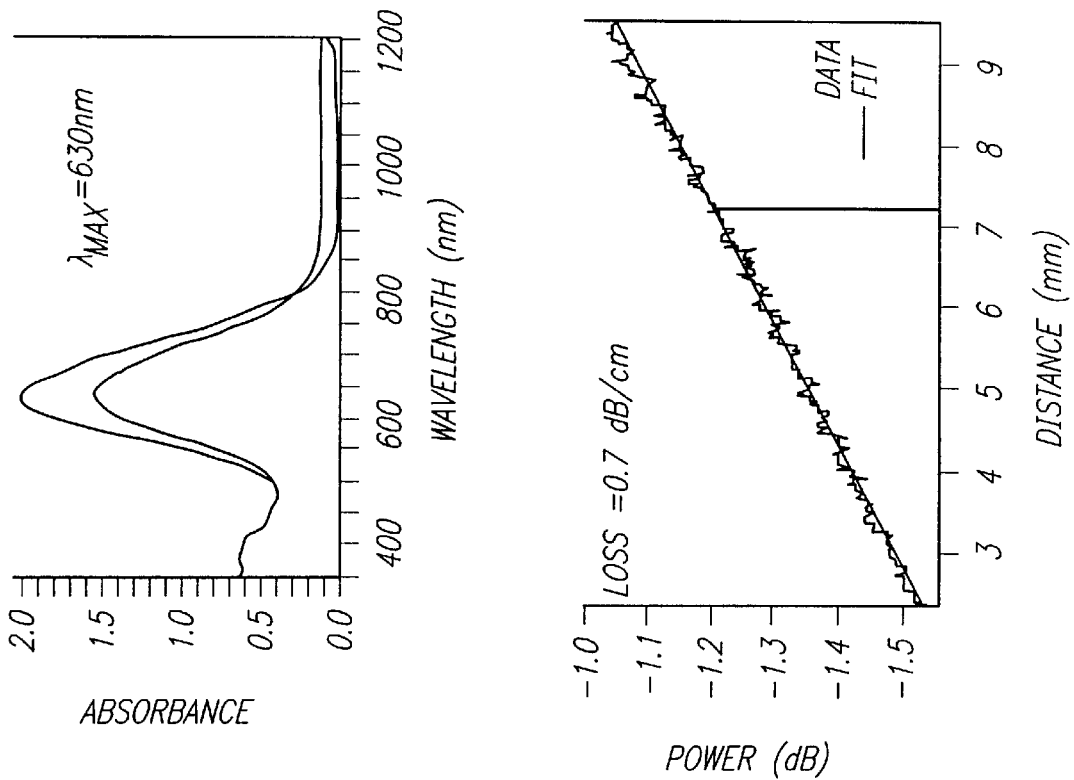
FIG. 5 shows the determination of optical and nonlinear optical properties of FTC/PMMA composite materials.

FIG. 5 shows the determination of optical and nonlinear optical properties of FTC/PMMA composite materials. The change in optical spectrum with poling (black before, red after) permits calculation of the polar order parameter and optical loss is measured by the method of Teng (C.C. Teng, "Precision Measurement of the Optical Attenuation Profile Along the Propagation Path in Thin-Film Waveguides", *Applied Optics*, Vol. 32, pages 1051–1054 (1993), incorporated herein by reference).

FIG. 6 provides a tabulation of measured electro-optic coefficient versus chromophore loading (chromophore number density). Also, given is the index of refraction versus chromophore loading which establishes that a solid solution is maintained over the concentration range studied.

Figure 7:
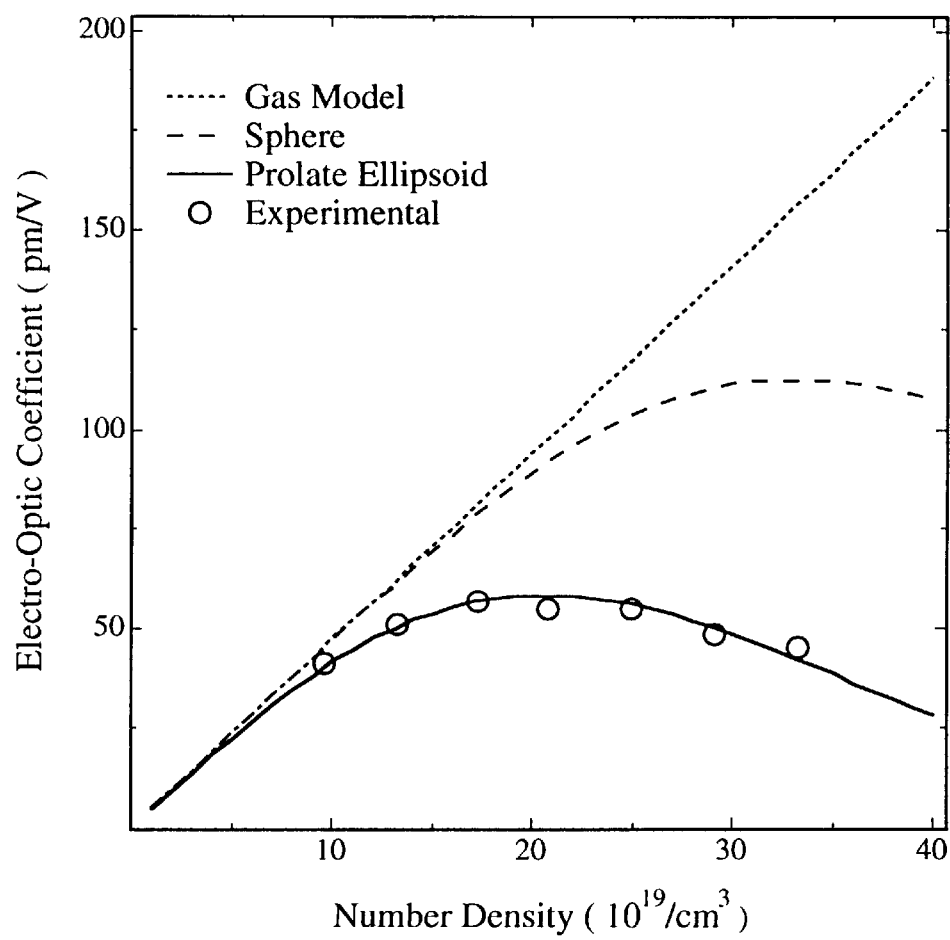
FIG. 7 shows the comparison of theoretical (lines) electro-optic data calculated for three different molecular models with experimental data (symbols).

FIG. 7 shows the comparison of theoretical (lines) electro-optic data calculated for three different molecular models with experimental data (symbols). The theoretical basis of the calculations is described by Dalton (See, L. Dalton et al., "The Role of London Forces in Defining Noncentrosymmetric Order of High Dipole Moment-High Hyperpolarizability Chromophores in Electrically Poled Polymeric Thin Films", *Proceedings of the National Academy of Sciences USA*, Vol. 94, pages 4842–4847 (1997), incorporated herein by reference).

FIG. 8 shows the synthesis of a hardened PU-FTC material.

Figure 9:
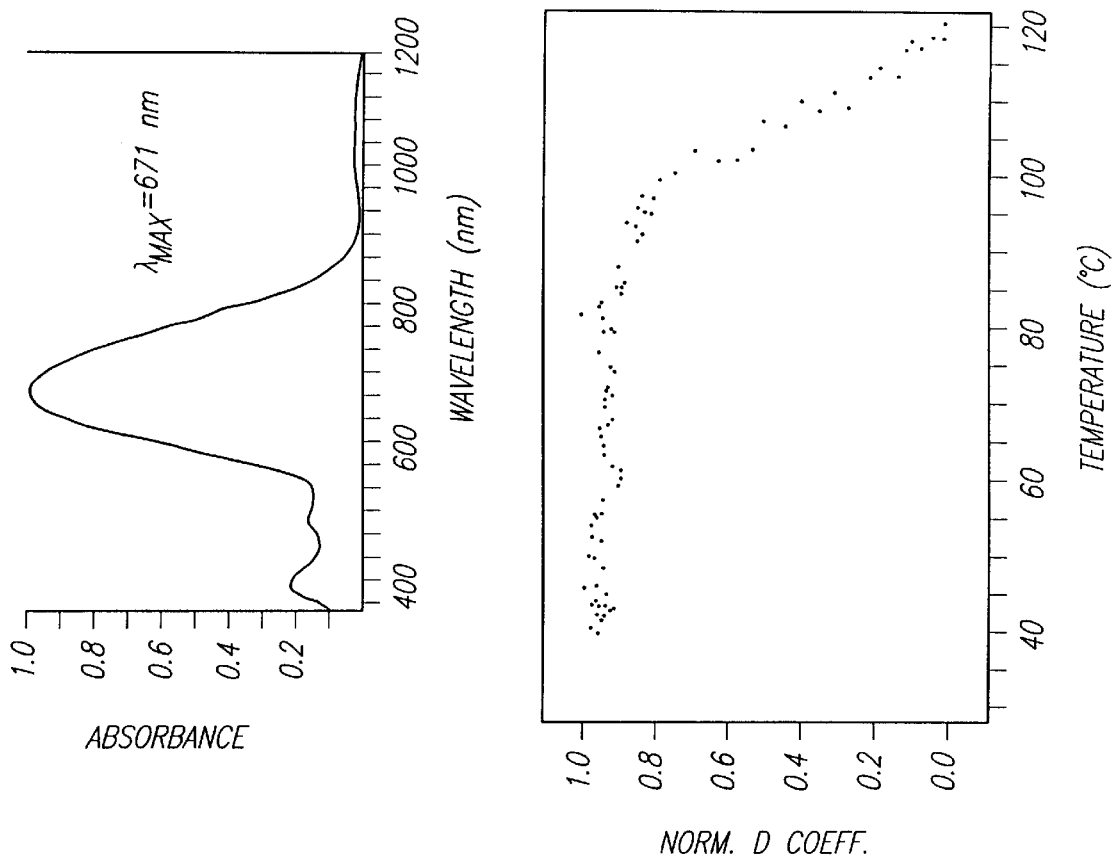
FIG. 9 summarizes optical and nonlinear optical data obtained for the PU-FTC material. Also shown is the thermal stability of the PU-FTC material obtained by monitoring second harmonic generation as a function of increasing the temperature.

FIG. 9 summarizes optical and nonlinear optical data obtained for the PU-FTC material. Also shown is the thermal stability of the PU-FTC material obtained by monitoring second harmonic generation as a function of increasing the temperature.

Figure 10:
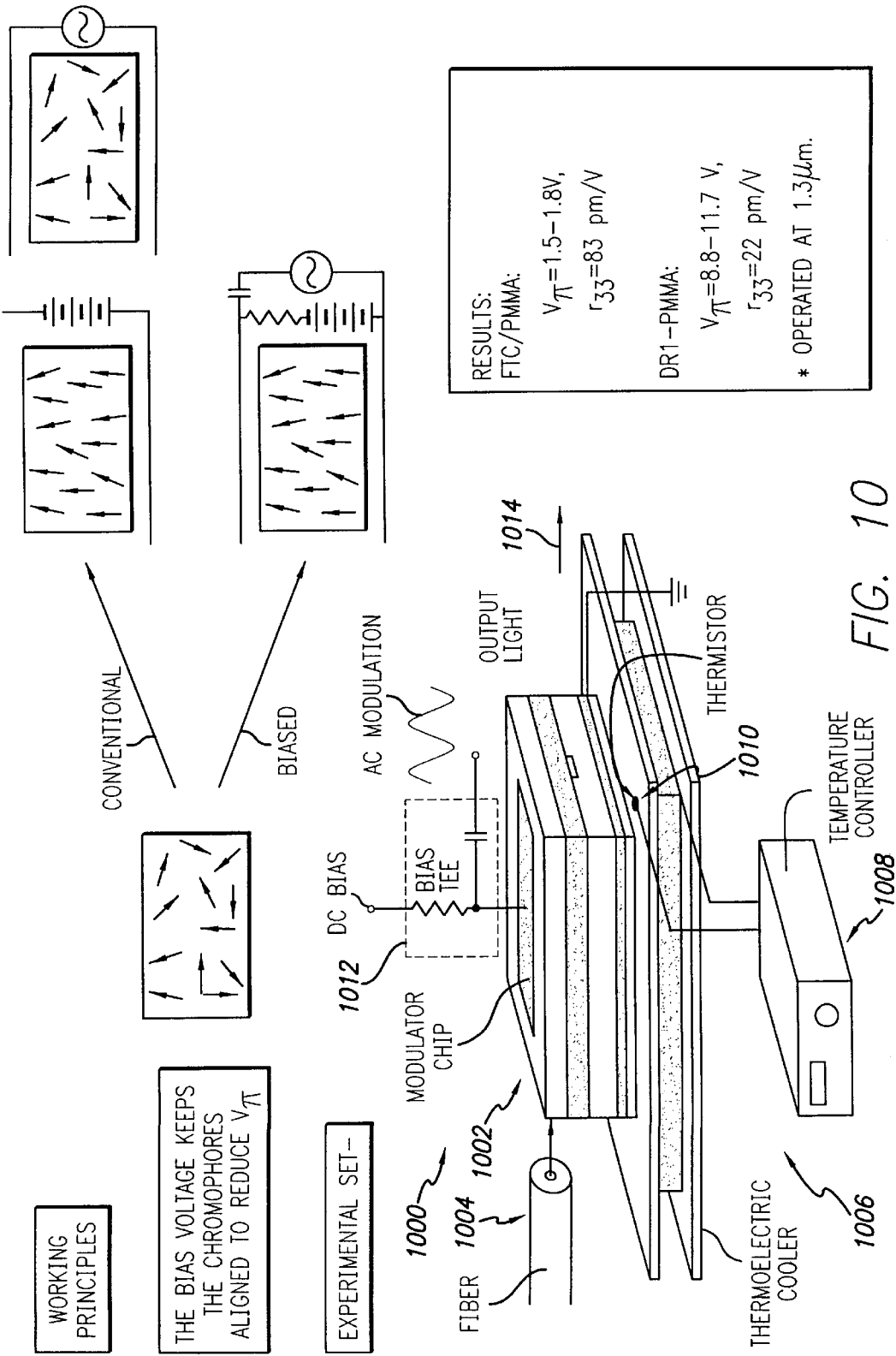
FIG. 10 illustrates an electro-optic device employing a constant electric field bias.

FIG. 10 illustrates an electro-optic device 1000 employing a constant electric field bias. In the illustrated embodiment, a modulator chip 1002, a fiber 1004, a thermoelectric cooler 1006, a temperature controller 1008, a thermister 1010, and a bias tee 1012 (including a resistor and a capacitor) are configured as shown providing a light output (arrow 1014).

Figure 11:
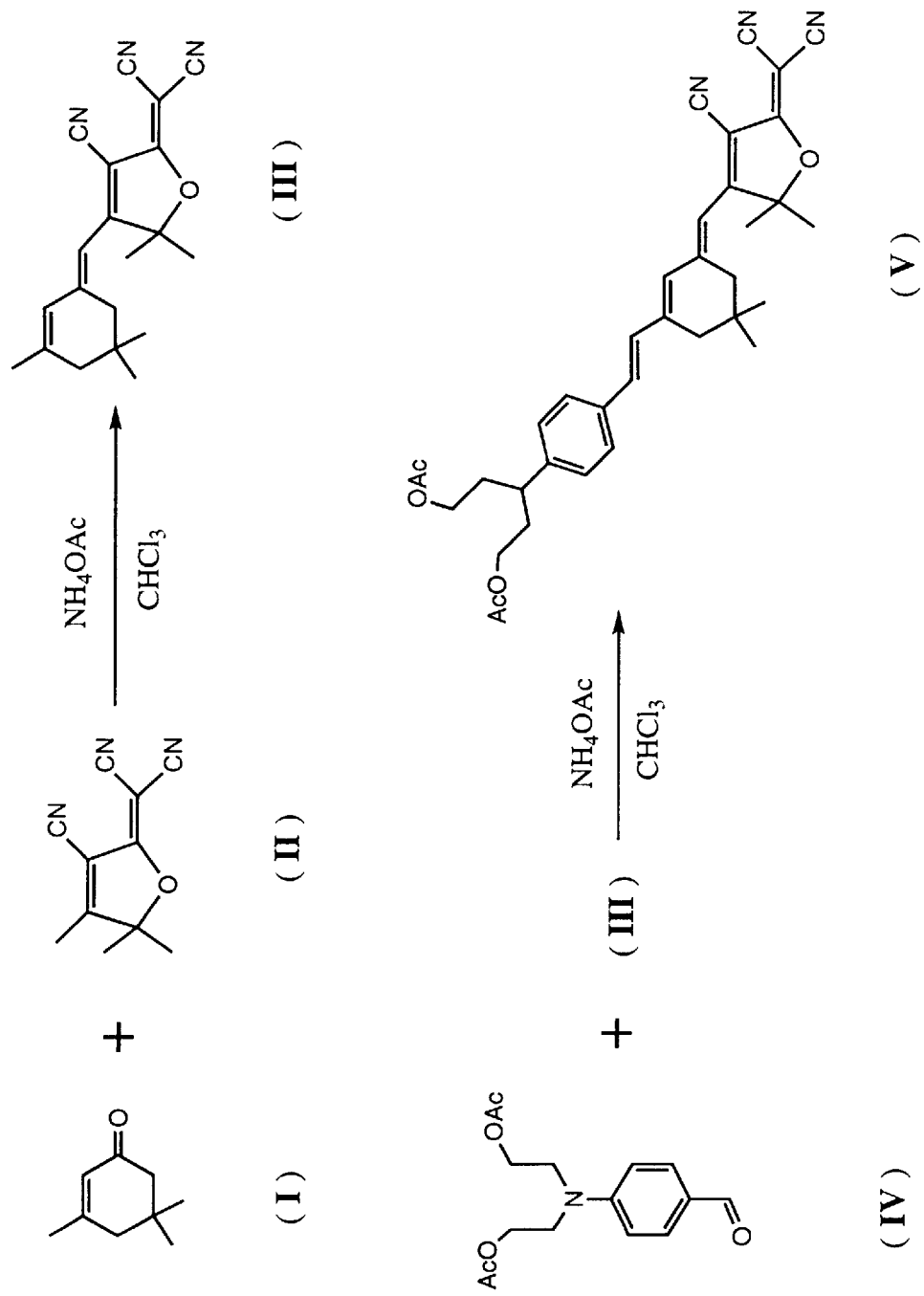
FIG. 11 illustrates the synthesis of an isophorone containing FTC chromophore.

FIG. 11 illustrates the synthesis of an isophorone containing FTC chromophore.

Figure 12:
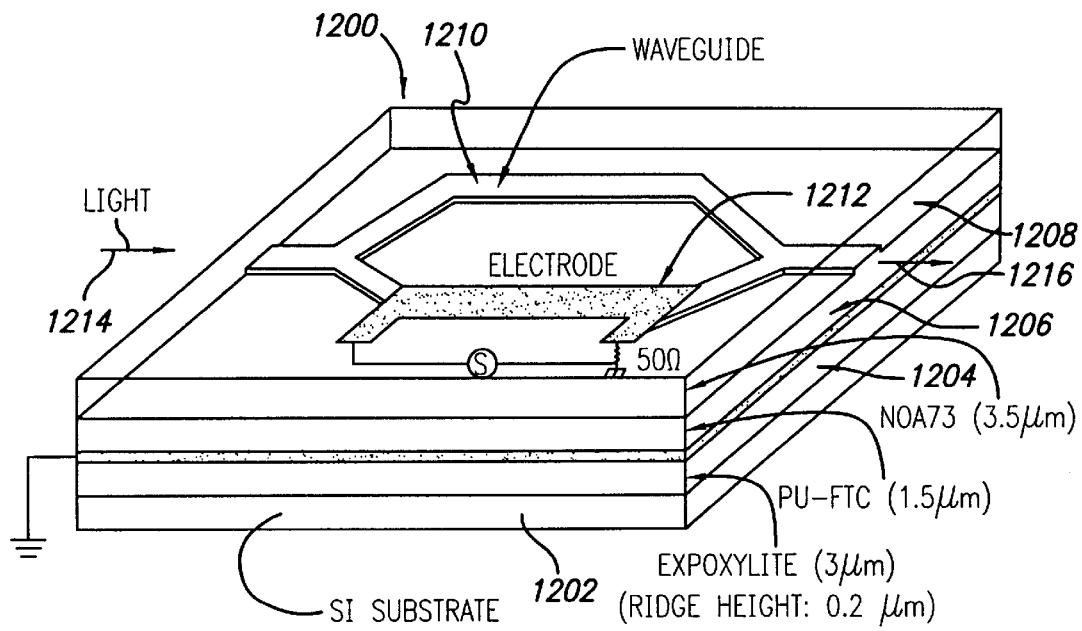
FIG. 12 shows a Mach Zehnder modulator incorporating the FTC materials of the present invention.

FIG. 12 shows a Mach Zehnder modulator 1200 incorporating the FTC materials of the present invention. In the illustrated embodiment, a Si substrate 1202, an Epoxylite (3 μm) layer 1204, a PU-FTC (1.5 μm) layer 1206, a NOA73 (3.5 μm) layer 1208, a waveguide 1210, and an electrode 1212 are configured as shown with light indicated by arrows 1214, 1216.

Figure 13:
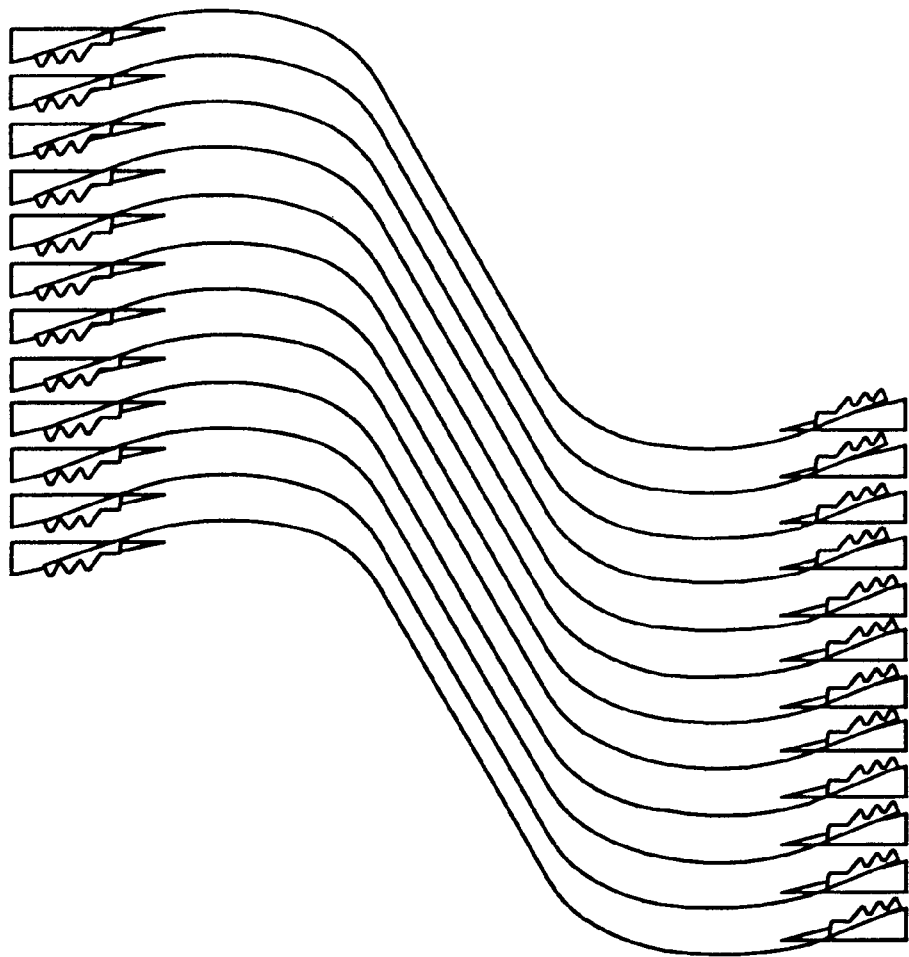
FIG. 13 shows the extension of the devices of the present invention to frequencies in excess of 100 GHz. using integrated microwave structures and the use of arrays of these devices.

FIG. 13 shows the extension of the devices of the present invention to frequencies in excess of 100 GHz. using integrated microwave structures and the use of arrays of these devices.

Figure 14:
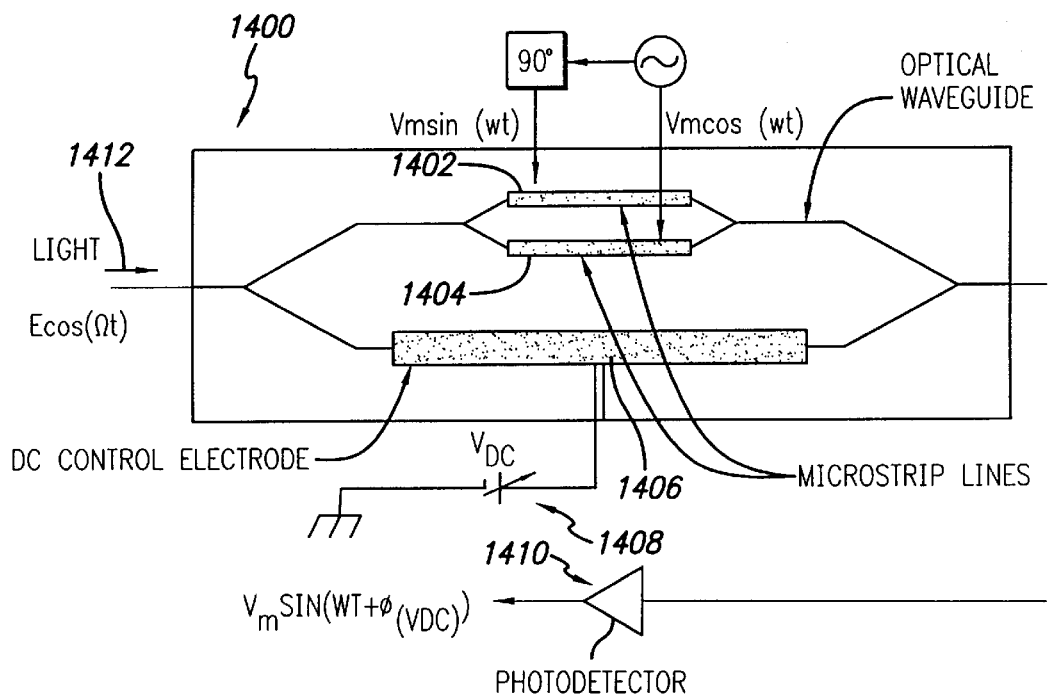
FIG. 14 shows the use of the materials of the present invention (in the form of microstrip lines) in a microwave phase shifter of the type employed in optically controlled phased array radars.

FIG. 14 shows the use of the materials of the present invention (in the form of microstrip lines) in a microwave phase shifter 1400 of the type employed in optically controlled phased array radars. In the illustrated embodiment of the photonically controlled RF phase shifter 1400, microstrip lines 1402, 1404, a DC control electrode 1406, a DC source 1408, and a photodetector 1410 are configured as shown with light indicated by arrow 1412.

Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A class of organic chromophores comprising:

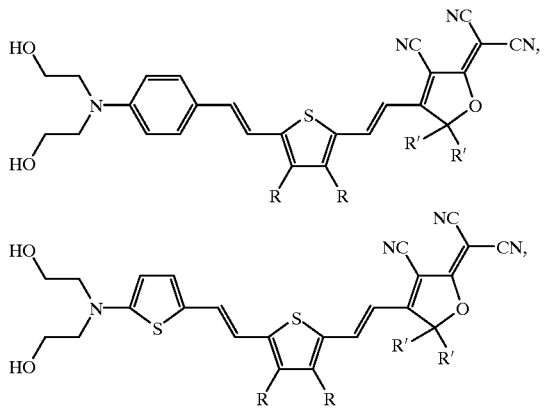

-continued

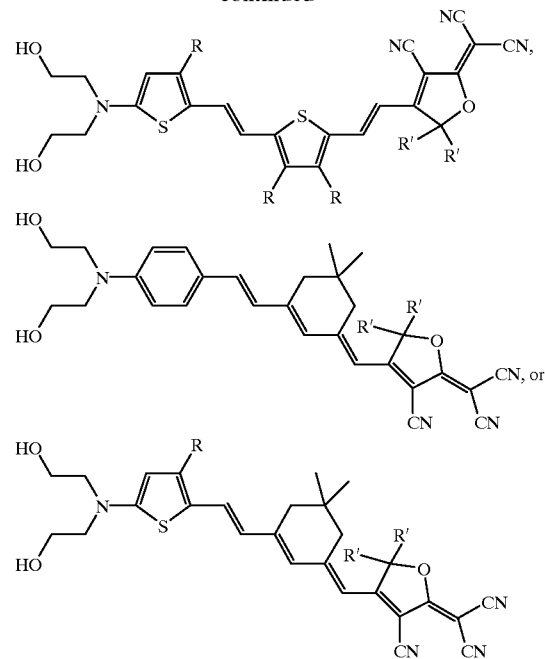

wherein:

R is —$(CH_2)_nCH_3$ with n=1–18, —$(CH_2)_nSi(CH_3)_3$ with n=1–18, —$(CH_2)_nC(CH_3)_3$ with n=1–18, or —$(CH_2)_nCH_2OR''$ with n=1–18, and R'' is H, Me, TBDMS, THP or Ac; and R' is —$(CH_2)_nCH_3$ with n=1–18, —$(CH_2)_nSi(CH_3)_3$ with n=1–18, —$(CH_2)_nC(CH_3)_3$ with n=1–18, or —$(CH_2)_nCH_2OR''$ with n=1–18, and R'' is H, Me, TBDMS, THP or Ac.

2. An organic chromophore comprising:

a three-part molecule including an amine electron donor group, a cyano furan electron acceptor group and a π-electron bridge the three-part molecule being formed as:

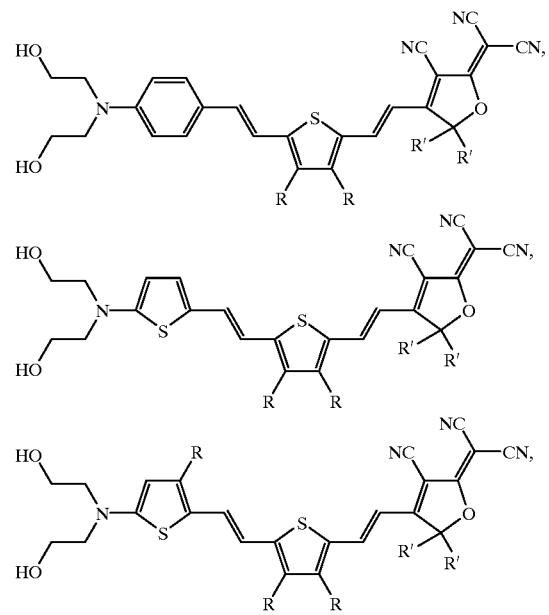

-continued

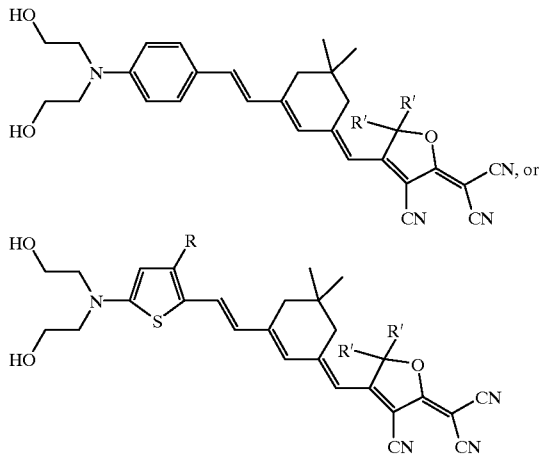

wherein:
R is —(CH$_2$)$_n$CH$_3$ with n=1–18, —(CH$_2$)$_n$Si(CH$_3$)$_3$ with n=1–18, —(CH$_2$)$_n$C(CH$_3$)$_3$ with n=1–18, or —(CH$_2$)$_n$CH$_2$OR" with n=1–18, and R" is H, Me, TBDMS, THP or Ac; and R' is —(CH$_2$)$_n$CH$_3$ with n=1–18, —(CH$_2$)$_n$Si(CH$_3$)$_3$ with n=1–18, —(CH$_2$)$_n$C(CH$_3$)$_3$ with n=1–18, or —(CH$_2$)$_n$CH$_2$OR" with n=1–18, and R" is H, Me, TBDMS, THP or Ac;

said three-part molecule being processed into a hardened material lattice within a polymer matrix suitable for a waveguide structure, said three-part molecule incorporating at least one organic substituent.

3. The organic chromophore of claim 2 wherein:
said at least one organic substituent comprises alkyl, aryl, and isophorone groups.

4. The organic chromophore of claim 2 wherein:
said waveguide structure is a buried channel waveguide structure.

5. The organic chromophore of claim 2 wherein:
said waveguide structure is an electro-optical modulator.

6. The organic chromophore of claim 5 wherein:
said waveguide structure is adapted to operate with a constant electric field and with a drive (V$_\pi$) voltage of 1.5 volts.

7. The organic chromophore of claim 6 wherein:
said drive (V$_\pi$) voltage corresponds to an electro-optic coefficient of 83 pm/V.

8. The organic chromophore of claim 2 wherein:
said at least one organic substituent is selected and formed to inhibit chromophore intermolecular interaction leading to attenuation of electro-optic activity and an increase in optical loss due to chromophore aggregation.

9. The organic chromophore of claim 2 wherein:
said at least one organic substituent is selected and formed to improve macroscopic electro-optic coefficients and to minimize optical loss from aggregation.

10. The organic chromophore of claim 2 wherein:
said chromophore is acentrically-aligned.

11. A composite including the organic chromophore of claim 3, the composite further comprising:
a polymer material.

12. The composite of claim 11 wherein:
said polymer material comprises poly(methylmacrylate).

13. The composite of claim 11 wherein:
said polymer material comprises polyimide.

14. The composite of claim 11 wherein:
said polymer material comprises polyamic acid.

15. The composite of claim 11 wherein:
said polymer material comprises polystyrene.

16. The composite of claim 11 wherein:
said polymer material comprises polycarbonate.

17. The composite of claim 11 wherein:
said polymer material comprises polyurethane.

18. A modulator device comprising:
an optical modulator formed from a high hyperpolarizability organic chromophore, the high hyperpolarizability organic chromophore being formed as:

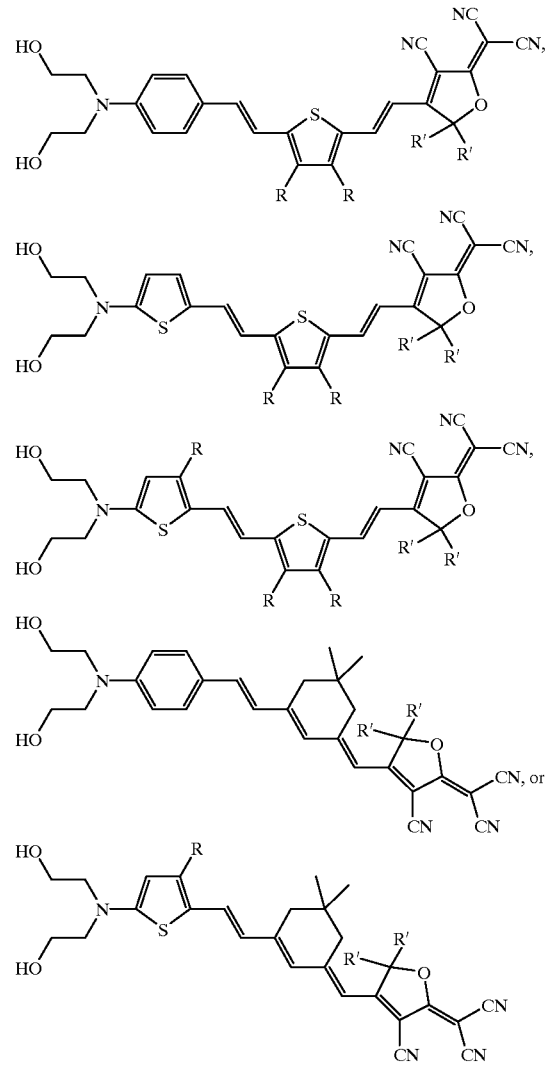

wherein:
R is —(CH$_2$)$_n$CH$_3$ with n=1–18, —(CH$_2$)$_n$Si(CH$_3$)$_3$ with n=1–18, —(CH$_2$)$_n$C(CH$_3$)$_3$ with n=1–18, or —(CH$_2$)$_n$CH$_2$OR" with n=1–18, and R" is H, Me, TBDMS, THP or Ac; and R' is —(CH$_2$)$_n$CH$_3$ with n=1–18, —(CH$_2$)$_n$Si(CH$_3$)$_3$ with n=1–18, —(CH$_2$)$_n$C(CH$_3$)$_3$ with n=1–18, or —(CH$_2$)$_n$CH$_2$OR" with n=1–18, and R" is H, Me, TBDMS, THP or Ac.

19. A modulator device comprising:
a combination of phase and amplitude modulators formed from high hyperpolarizability organic chromophores, the high hyperpolarizability organic chromophores being selected from the group consisting of:

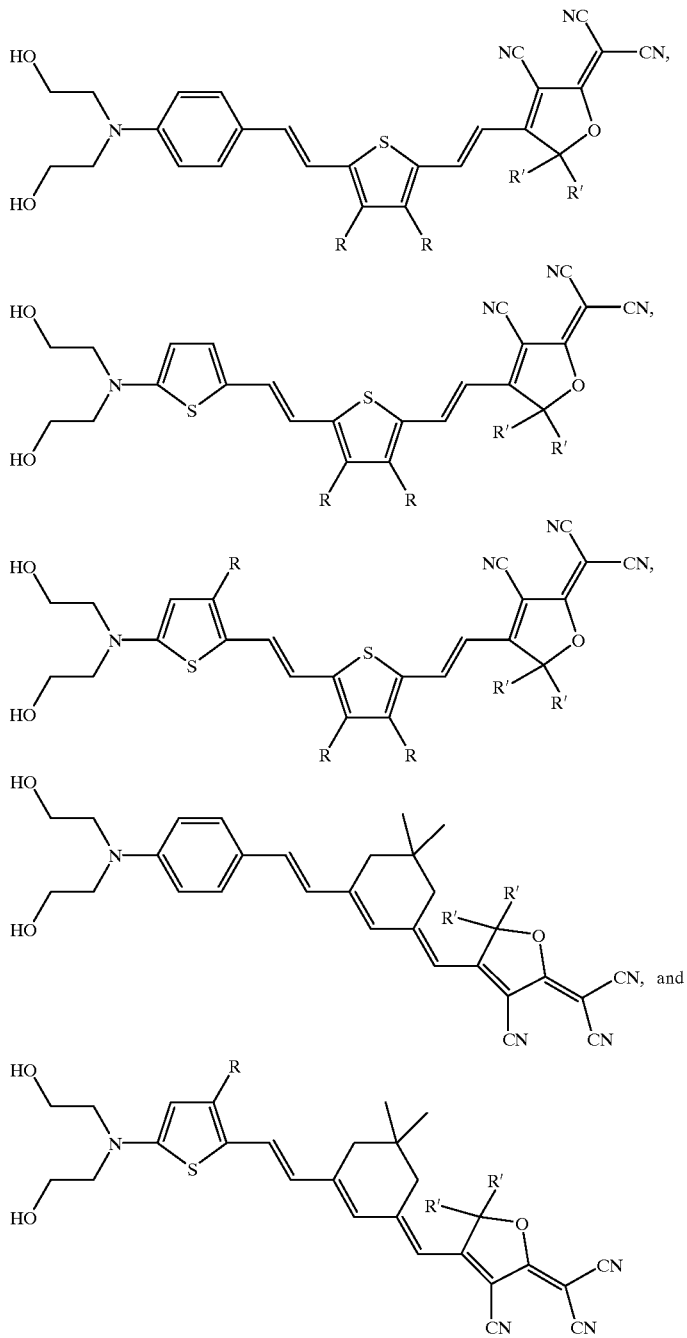

wherein:

R is —$(CH_2)_n CH_3$ with n=1–18, —$(CH_2)_n Si(CH_3)_3$ with n=1–18, —$(CH_2)_n C(CH_3)_3$ with n=1–18, or —$(CH_2)_n CH_2 OR''$ with n=1–18, and R" is H, Me, TBDMS, THP or Ac; and R' is —$(CH_2)_n CH_3$ with n=1–18, —$(CH_2)_n Si(CH_3)_3$ with n=1–18, —$(CH_2)_n CH_3)_3$ with n=1–18, or —$(CH_2)_n CH_2 OR''$ with n=1–18, and R" is H, Me, TBDMS, THP or Ac;

said modulators being configured to perform signal processing.

* * * * *